(12) United States Patent
Zheng et al.

(10) Patent No.: US 11,493,181 B2
(45) Date of Patent: Nov. 8, 2022

(54) SNOWFLAKE PROJECTION LAMP

(71) Applicant: Shenzhen Bolong Technology Co. Ltd., Shenzhen (CN)

(72) Inventors: Huazhu Zheng, Shenzhen (CN); Yunyun Lu, Shenzhen (CN); Caijian Zheng, Shenzhen (CN); Wenzhen Ouyang, Shenzhen (CN)

(*) Notice: Subject to any disclaimer, the term of this patent is extended or adjusted under 35 U.S.C. 154(b) by 0 days.

(21) Appl. No.: 17/471,160

(22) Filed: Sep. 10, 2021

(65) Prior Publication Data
US 2021/0404617 A1 Dec. 30, 2021

(30) Foreign Application Priority Data
Aug. 16, 2021 (CN) .......................... 202121919874.9

(51) Int. Cl.
| | | |
|---|---|---|
| F21S 10/00 | (2006.01) |
| F21V 21/30 | (2006.01) |
| F21V 31/00 | (2006.01) |
| F21V 21/092 | (2006.01) |
| F21W 121/00 | (2006.01) |
| F21V 21/08 | (2006.01) |

(52) U.S. Cl.
CPC ............ F21S 10/007 (2013.01); F21V 21/30 (2013.01); F21V 31/005 (2013.01); *F21V 21/0824* (2013.01); *F21V 21/092* (2013.01); *F21W 2121/006* (2013.01)

(58) Field of Classification Search
CPC . F21W 2121/006; F21V 14/006; F21V 5/007; F21V 21/0824; F21V 21/30; F21V 21/26; F21V 31/00; F21V 31/005; F21S 10/007; F21S 10/026; F21S 10/00
See application file for complete search history.

(56) References Cited

U.S. PATENT DOCUMENTS

| | | | | |
|---|---|---|---|---|
| 6,078,443 A | * | 6/2000 | Yu | F21S 10/007 |
| | | | | 359/892 |
| 9,194,551 B1 | * | 11/2015 | Zhang | G03B 21/2033 |
| 10,042,238 B1 | * | 8/2018 | Zhang | G03B 23/12 |
| 10,072,824 B1 | * | 9/2018 | Xiong | F21S 10/007 |
| 10,120,270 B1 | * | 11/2018 | Zhang | G02B 27/0955 |
| 10,125,954 B1 | * | 11/2018 | Zhang | F21V 21/06 |
| 10,146,120 B1 | * | 12/2018 | Zhang | G03B 21/43 |
| 10,156,777 B1 | * | 12/2018 | Altamura | G03B 21/001 |
| 10,324,266 B1 | * | 6/2019 | Advani | F21V 14/06 |

(Continued)

*Primary Examiner* — Jong-Suk (James) Lee
*Assistant Examiner* — James M Endo

(57) ABSTRACT

The present invention relates to a snowflake projection lamp, including a housing, a concatemer optical lens arranged at the front end of the housing, a main control board and a projection component arranged in the housing, and a rotating shaft component connected to the lower end of the housing, where the front end of the housing is provided with an opening, the inner side of the opening is provided with a first surrounding wall, the concatemer optical lens includes a mounting base and a lens group, a first groove is internally provided with a sealing ring, and the concatemer optical lens is pressed on the first surrounding wall of the housing through the sealing ring; Lamplight of a high-brightness light source component passes through a film driven by a motor component to project multiple dynamic spots with different sizes and snowflake patterns in a designated region.

7 Claims, 6 Drawing Sheets

(56) References Cited

U.S. PATENT DOCUMENTS

| | | | |
|---|---|---|---|
| 2002/0181234 A1* | 12/2002 | Kawahara | G02B 3/00 362/257 |
| 2004/0090781 A1* | 5/2004 | Yeoh | F21V 21/30 362/287 |
| 2004/0119951 A1* | 6/2004 | Vitantonio | G03B 21/145 353/119 |
| 2007/0097681 A1* | 5/2007 | Chich | F21S 10/00 362/232 |
| 2008/0048566 A1* | 2/2008 | Lin | F21V 23/00 315/130 |
| 2011/0051097 A1* | 3/2011 | Lin | G03B 23/18 353/46 |
| 2013/0229799 A1 | 9/2013 | Lee et al. | |
| 2015/0131288 A1* | 5/2015 | Zhang | F21S 8/00 362/277 |
| 2016/0026073 A1* | 1/2016 | Zhang | G03B 21/142 353/101 |
| 2016/0209013 A1* | 7/2016 | Chien | F21S 10/002 |
| 2016/0215962 A1* | 7/2016 | Chien | F21V 11/08 |
| 2017/0082254 A1* | 3/2017 | Zhang | F21V 13/02 |
| 2017/0219176 A1* | 8/2017 | Chang | F21V 15/01 |
| 2018/0283657 A1* | 10/2018 | Xiong | F21V 21/0824 |
| 2018/0283663 A1* | 10/2018 | Zhang | F21V 11/08 |
| 2019/0011824 A1* | 1/2019 | Xi | G03B 21/52 |
| 2019/0078768 A1* | 3/2019 | Altamura | F21S 10/063 |
| 2019/0086055 A1* | 3/2019 | Qiu | F21S 10/023 |
| 2019/0132544 A1* | 5/2019 | Xi | H04N 9/3105 |
| 2021/0164628 A1 | 6/2021 | Zheng et al. | |

* cited by examiner

SNOWFLAKE PROJECTION LAMP

TECHNICAL FIELD

The present invention relates to the technical field of lamps, and in particular, to a snowflake projection lamp.

BACKGROUND

A snowflake lamp refers to a snowflake projection lamp for projecting to form a dynamic snowflake effect. At present, snowflake lamps on the market generally use a projection lens composed of a single convex lens, which uses a light source to project a snowflake pattern on a film between the light source and the projection lens to a specified position through the projection lens. However, a snow scene acquired in this way has only one region with a snowflake pattern, and the whole snow scene is relatively dull and boring, and it is impossible to create a rich and dreamy atmosphere.

Many families have a growing demand for snow lamp projections. However, existing projectors use multiple small lenses integrated on a flat panel to project a large-range pattern, resulting in different projection ranges for each small lens and poor display quality. In addition, most of the current snowflake projection lamps are used indoors, are difficult to mount in some complicated outdoor environments, and are easily damaged by rain outdoors on rainy days. In view of this, it is necessary to improve the current snowflake projection lamps.

SUMMARY

To overcome the disadvantages of the prior art, the present invention provides a snowflake projection lamp, aiming at solving the technical problems that the current snowflake projection lamps cannot project to form a high-brightness spot effect and is not waterproof.

The technical solution for solving the technical problem in the present invention is: a snowflake projection lamp, including a housing, a concatemer optical lens arranged at the front end of the housing, a main control board and a projection component arranged in the housing, and a rotating shaft component connected to the lower end of the housing.

The front end of the housing is provided with an opening, the inner side of the opening is provided with a first surrounding wall, the concatemer optical lens includes a mounting base and a lens group, the lens group includes at least two annular lenses, a first groove is formed on the mounting base, the first groove is internally provided with a sealing ring, and the concatemer optical lens is pressed on the first surrounding wall of the housing through the sealing ring.

The projection component includes a film, a high-brightness light source component and a motor component, the motor component drives the film to rotate, and the projection component is electrically connected to the main control board.

The housing is rotationally connected to the rotating shaft component, the housing is internally provided with the main control board, the rear end of the housing is recessed inward to form a second groove, the second groove is provided with a first through hole for a power cord to pass through, the second groove is internally provided with a waterproof gasket and a pressing part, a second through hole and a third through hole are formed in the waterproof gasket and the pressing part respectively, and the first through hole, the second through hole and the third through hole communicate with one another.

In one embodiment, the pressing part is a hexagonal threaded head, an internal thread is provided on a side wall of the second groove, and the hexagonal threaded head is threadedly connected into the first through hole and presses the waterproof gasket into the second groove.

In one embodiment, at least two kinds of snowflake patterns are arranged on the film, four light condensers and four lamp beads are respectively arranged correspondingly, and the four light condensers are arranged symmetrically in pairs.

In one embodiment, the high-brightness light source component includes the light condensers and the lamp beads, the main control board is arranged between the motor component and the light condensers, the lamp beads are arranged on the main control board, and an output shaft of the motor component passes through the main control board and is connected to the film.

In one embodiment, the lens group includes thirty-seven annular lenses, and the area of a shading region between every two adjacent annular lenses is the same.

In one embodiment, the bottom of the housing is provided with a convex bar, the convex bar is arranged at one end of the housing close to the concatemer optical lens, an avoidance groove is formed on the convex bar, the rotating shaft component includes a first support, a second support, a damping spring and a sleeve fixing screw, the first support includes a plugging plate in plug-in connection with the avoidance groove and a first connecting plate arranged perpendicularly to the plugging plate, the first connecting plate is connected to a plugging post, the second support includes a first sleeve and a second sleeve arranged perpendicularly to the first sleeve, the plugging post is sleeved in the first sleeve and is fixed through the sleeve fixing screw, and the damping spring is arranged in a gap between the plugging post and the first sleeve.

In one embodiment, the first support and the second support are provided with a first tooth and a second tooth respectively, and the first tooth and the second tooth are meshed.

In one embodiment, the mounting base is provided with a pressure block corresponding to the position of the avoidance groove, and the mounting base is fixed to the housing through a screw.

In one embodiment, the snowflake projection lamp further includes a base detachably connected to the second sleeve, and the base includes a bottom disc and a connecting post adapted to the second sleeve.

In one embodiment, the snowflake projection lamp further includes a ground stake detachably connected to the second sleeve, the ground stake includes a mounting portion, a rod body and an embedded part, a convex step is arranged between the mounting portion and the rod body, the mounting portion is detachably sleeved in the second sleeve, and the second support abuts against the convex step.

The present invention has the advantageous effects that, in the snowflake projection lamp of the present invention, at least two annular lenses are distributed on the lens group of the concatemer optical lens, lamplight of the high-brightness light source component passes through the film driven by the motor component, and is refracted by the concatemer optical lens to project multiple dynamic spots with different sizes and snowflake patterns in a designated region, so that a snow scene is more vivid with light and shade interlacing, enhancing the sense of layering of a projected image; and in addition, at least two sealing rings are arranged between the concatemer optical lens and the housing, the second groove is provided at the rear end of the housing, the waterproof gasket is arranged in the second groove, and the waterproof gasket is pressed to the second groove by using a pressing part, and is used for waterproofing a place which the power cord passes through, achieving a waterproof function in an outdoor environment and improving user experience.

BRIEF DESCRIPTION OF DRAWINGS

The present invention will be further described with reference to accompanying drawings and embodiments, in which.

Figure 1:
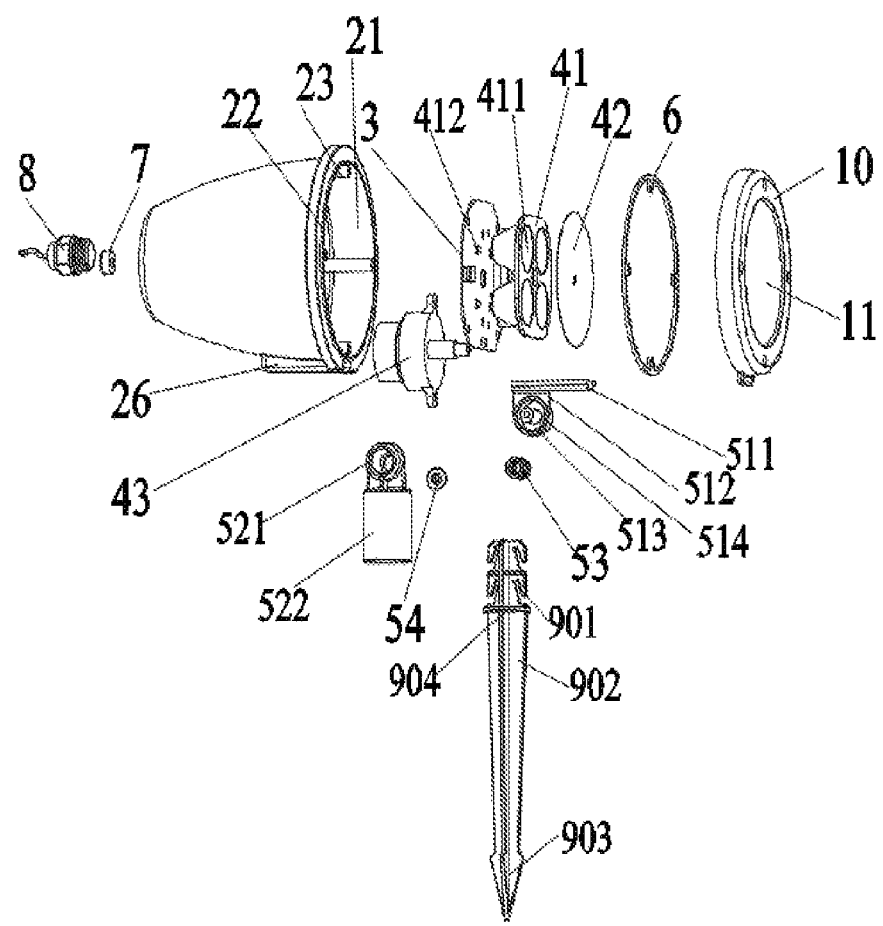
FIG. 1 is a schematic exploded structural diagram of a snowflake projection lamp according to the present invention.
Figure 2:
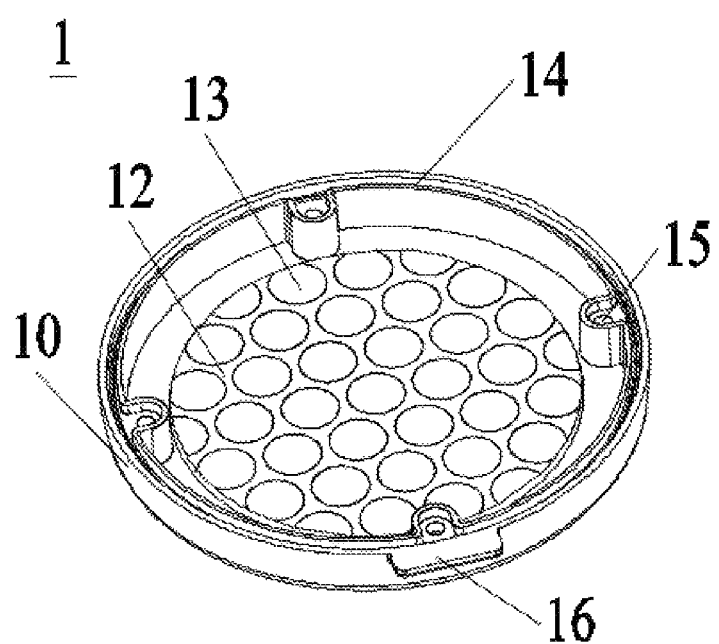
FIG. 2 is a schematic structural diagram of a concatemer optical lens according to the present invention.

Reference numerals in the figures: concatemer optical lens 1; mounting base 10; lens group 11; shading region 12; annular lens 13; first groove 14; threaded hole 15; pressure block 16; housing 2; accommodating cavity 21; first surrounding wall 22; threaded post 23; second groove 24; first through hole 25; convex bar 26; avoidance groove 27; main control board 3; light condenser component 41; light condenser 411; lamp bead 412; film 42; motor component 43; rotating shaft component 5; first support 51; plugging plate 511; first connecting plate 512; plugging post 513; first tooth 514; second support 52; first sleeve 521; second sleeve 522; damping spring 53; sleeve fixing screw 54; sealing ring 6; waterproof gasket 7; hexagonal threaded head 8; ground stake 90; mounting portion 901; rod body 902; embedded part 903; convex step 904; base 91; bottom disc 911; connecting post 912.

DESCRIPTION OF EMBODIMENTS

To make the technical problems to be solved, technical solutions and advantageous effects of the present invention clearer, the present invention is further described in detail with reference to accompanying drawings and embodiments below. It should be understood that the specific embodiments described herein are merely used to explain the present invention, and are not used to limit the present invention.

With reference to FIG. 1 to FIG. 6, in this embodiment, provided is a snowflake projection lamp, including a housing 2, a concatemer optical lens 1 arranged at the front end of the housing 2, a main control board 3 and a projection component arranged in the housing 2, and a rotating shaft component 5 connected to the lower end of the housing 2. The projection component is electrically connected to the main control board 3, and a snowflake projection pattern of the projection component is refracted by the concatemer optical lens 1 to form a light spot with the snowflake pattern. The rotating shaft component 5 is used to adjust the angle of the housing 2 and adjust a projection angle.

Figure 3:
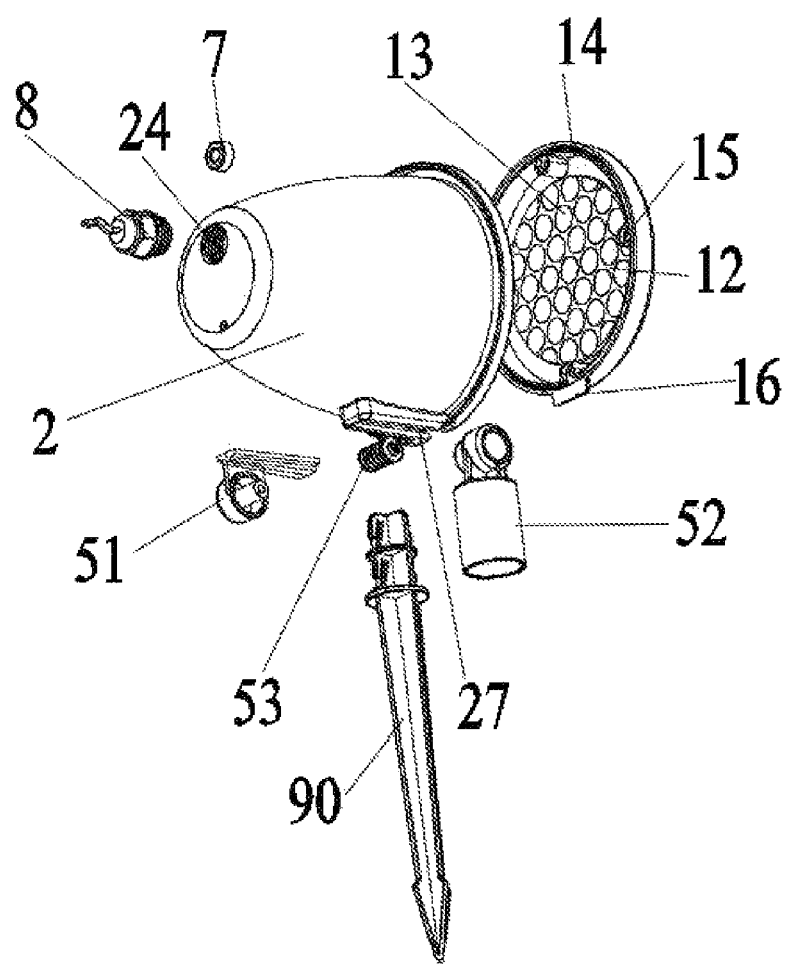
FIG. 3 is a schematic exploded structural diagram of the snowflake projection lamp according to the present invention from another angle.

With further reference to FIG. 3, specifically, the housing 2 is in the shape of an ellipse with a large front end and a small rear end, the front end of the housing 2 is provided with an opening, an accommodating cavity 21 is formed inside, the concatemer optical lens 1 is arranged at one end of the opening of the housing 2, the concatemer optical lens 1 is transparent, and a circular pattern may be seen from the outside surface thereof, which enhances the beauty. The concatemer optical lens 1 includes a mounting base 10 and a lens group 11, the mounting base 10 is fixed to the housing 2, the lens group 11 includes at least two annular lenses 13, and the annular lenses 13 are evenly distributed on the lens group 11.

In a specific embodiment, the lens group 11 includes thirty-seven annular lenses 13, the thirty-seven annular lenses 13 are evenly spaced on the lens group 11, so that the concatemer optical lens 1 may project thirty-seven light spots at one time, and the area of a light shading region 12 between every two adjacent annular lenses 13 is equal, which is beneficial to making full use of the light effect of the light source and improves the overall brightness of a projected image. Certainly, according to specific requirements on the number of the light spots, in other embodiments of the present invention, the concatemer optical lens 1 may include a different number of annular lenses 13, and the multiple annular lenses 13 may be circumferentially arranged around the central axis of the mounting base 10, which is not uniquely limited herein.

The inner side of the opening of the housing 2 is provided with a first surrounding wall 22, a first groove 14 is formed on the inner side of the mounting base 10, and when the mounting base 10 is fixed to the housing 2, an outer wall of the first groove 14 abuts against the first groove 14. In this embodiment, the mounting base 10 is provided with threaded holes 15, an inner wall of the housing 2 is further provided with threaded posts 23, the mounting base 10 and the housing 2 are locked through a screw or the like, and the four threaded posts 23 and the four threaded holes 15 are evenly distributed respectively. In other embodiments, the housing 2 and the mounting base 10 may also be locked through thread connection.

More specifically, to prevent rainwater and the like from entering the housing 2 and affecting the life of the snowflake projector lamp during outdoor use, the snowflake projector lamp further includes a sealing ring 6, the sealing ring 6 is arranged in the first groove 14, and when the mounting base 10 is placed on the housing 2, the sealing ring 6 is pressed and placed at the upper end of the first surrounding wall 22 to prevent water vapor and the like from entering the accommodating cavity 21 of the housing 2.

The main control board 3 is arranged in the accommodating cavity 21 of the housing 2, the main control board 3 is electrically connected to the projection component, the main control board 3 is connected to a power cord, the rear end of the housing 2 is recessed inward to form a second groove 24, the second groove 24 is provided with a first through hole (not shown in the figures) for the power cord to pass through, the second groove 24 is internally provided with a waterproof gasket 7 and a pressing part, a second through hole is formed in the waterproof gasket 7, the pressing part is provided with a third through hole, and a place where the power cord passes through is waterproof by using the pressing part and the waterproof gasket 7 to achieve the sealing of the second groove 24, so that the snowflake projection lamp is capable of adapting to various complex environments and enhancing the use experience of a user, and the power cord passes through the waterproof gasket 7 and the pressing part and is combined with the housing 2 to achieve a sealing effect.

Furthermore, the pressing part is a hexagonal threaded head 8, a third through hole through which the power cord passes is formed in the hexagonal threaded head 8, an internal thread is provided on the inner wall of the second groove 24, the hexagonal threaded head 8 is threadedly connected in the first through hole and presses the waterproof gasket 7 into the second groove 24, and the first through hole, the second through hole and the third through hole communicate with one another and are used for the power cord to pass through. The thread connection manner may increase the waterproof performance of a product and improve the waterproof effect. The sealing ring 6 and the waterproof gasket 7 are used to realize the waterproofing of the front and rear ends of the snowflake projection lamp, improving the waterproof performance thereof, and increasing application scenarios thereof. In other embodiments, the pressing part may be a sealing plug or the like.

Figure 4:
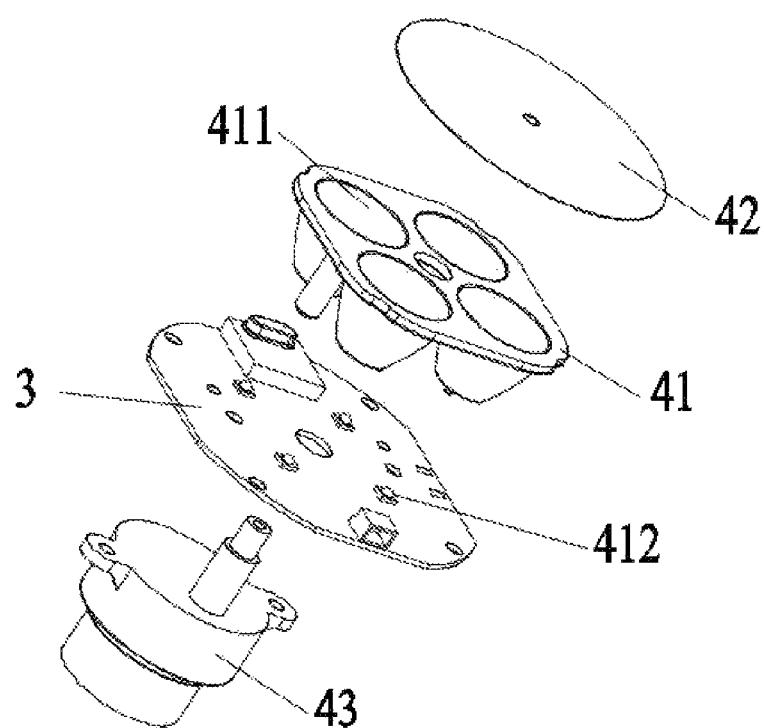
FIG. 4 is a schematic structural diagram of a projection component according to the present invention.
Figure 5:
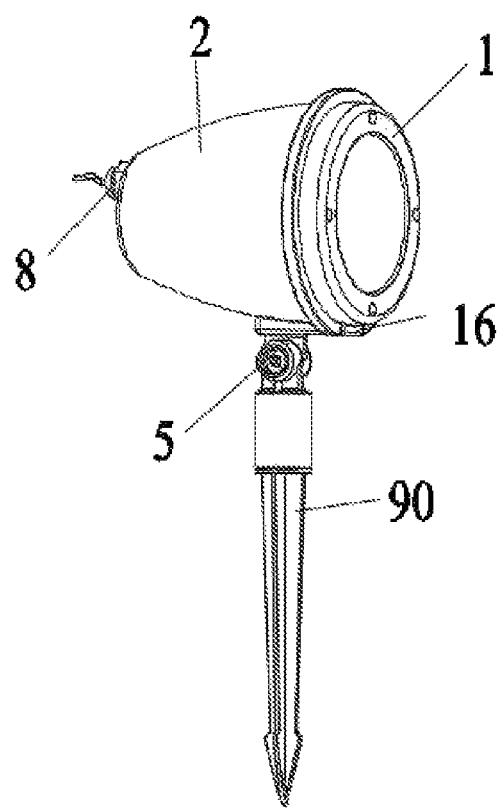
FIG. 5 is a schematic overall structural diagram of a snowflake projection lamp in an embodiment of the present invention.

With reference to FIG. 4, the projection component includes a high-brightness light source component, a film 42 and a corresponding motor component 43, where the motor component 43 drives the film 42 to rotate to achieve a rotating snowflake effect, which may achieve a better projection effect. Preferably, the film 42 is provided with at least two kinds of snowflake patterns, and snowflake light spots with different styles are formed after the concatemer optical lens 1 functions.

The high-brightness light source component includes a light condenser 411 and a lamp bead 412, where the main control board 3 is arranged between the motor component 43 and the light condenser 411, the lamp bead 412 is arranged on the main control board 3, an output shaft of the motor component 43 passes through the main control board 3 and is connected to the film 42, and the main control board 3 is fixed to the housing 2 through a screw.

In one embodiment, four light condenser 411 and four lamp beads 412 are respectively provided, and the four lamp beads 412 are evenly distributed on the main control board 3. The four light condensers 411 are combined to form an arc-shaped light condenser component 41 with a through hole formed in the middle for the output shaft of the motor component 43 to pass through. Each light condenser 411 is a plano-convex lens, a concave surface of the condenser component 41 is arranged toward the lamp bead 412, and a convex surface of the concatemer optical lens 1 faces the film 42. In this way, when light of the lamp bead 412 is emitted, first the light is condensed by the light condenser 411, and then the light is emitted from the convex surface of the concatemer optical lens 1 in a horizontal direction through the film 42 for projection, which may correct advanced aberrations and improve imaging quality of a projector. In this embodiment, the condenser 411 is a condensing cup.

In this embodiment, the light condenser 411 and the concatemer optical lens 1 are both optical plastic parts. Optical plastic has good plasticity, light weight and low cost, and may effectively control a production cost of the snowflake projection lamp.

The rotating shaft component 5 is connected to the lower end of the housing 2, and the housing 2 is rotationally connected to the rotating shaft component 5 to adjust the projection angle of the snowflake projection lamp. Specifically, a convex bar 26 is arranged at the bottom of the housing 2, the convex bar 26 is arranged at one end of the housing 2 close to the concatemer optical lens 1, and an avoidance groove 27 is formed on the convex bar 26. The rotating shaft component 5 includes a first support 51, a second support 52, a damping spring 53 and a sleeve fixing screw 54, the first support 51 includes a plugging plate 511 in plug-in connection with the avoidance groove 27 and a first connecting plate 512 arranged perpendicularly to the plugging plate 511, the first connecting plate 512 is connected to a plugging post 513, the second support 52 includes a first sleeve 521 and a second sleeve 522 arranged perpendicularly to the first sleeve 521, the plugging post 513 is rotationally sleeved in the first sleeve 521, the damping spring 53 is arranged between the plugging post 513 and the first sleeve 521, and the sleeve fixing screw 54 is used for locking the first sleeve 521 and the plugging post 513. The plugging plate 511 is plugged into the avoidance groove 27, the mounting base 10 is further provided with a pressure block 16 corresponding to the position of the avoidance groove 27, and the pressure block 16 is used to limit the first support 51 to the housing 2 for pressing.

More specifically, the first support 51 and the second support 52 are provided with a first tooth 514 and a second tooth (not shown in the figures) respectively, and through meshing between the first tooth 514 and the second tooth, locking between the first support 51 and the second support 52 is performed. In addition, the effect of the damping spring 53 is used to realize the stability of the housing 2 after rotating.

With reference to FIG. 1 to FIG. 5, in one embodiment, the snowflake projection lamp of the present invention further includes a ground stake 90, and the ground stake 90 is used for being plugged in the ground when the snowflake projection lamp is placed outdoors, and is detachably connected to the second sleeve 522. Specifically, the ground stake 90 includes a mounting portion 901, a rod body 902 and an embedded part 903, where a convex step 904 is provided between the mounting portion 901 and the rod body 902, the outer diameter of the mounting portion 901 is smaller than the inner diameter of the second sleeve 522, the mounting portion 901 is detachably sleeved in the second sleeve 522, and the second support 52 abuts against the convex step 904. The structure of the ground stake 90 may be used to facilitate the outdoor use of the snowflake projection lamp.

Figure 6:
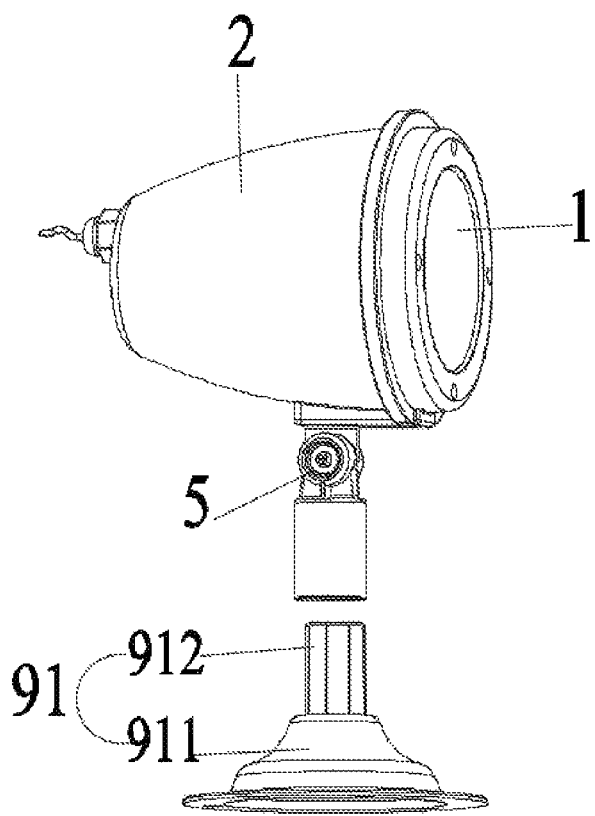
FIG. 6 is a schematic overall structural diagram of a snowflake projection lamp in another embodiment of the present invention.

With reference to FIG. 6, in another embodiment, the snowflake projection lamp of the present invention further includes a base 91 detachably connected to the second sleeve 522, and the base 91 includes a bottom disc 911 and a connecting post 912 adapted to the second sleeve 522, where the bottom disc 911 may be a sucking disk with suction force, and the base may be used to facilitate indoor use of the snowflake projection lamp.

In the snowflake projection lamp of the present invention, lamplight of the high-brightness light source component passes through the multi-pattern film 42 after being condensed, and under the actions of the motor component 43 and the refraction of the concatemer optical lens 1, projection is performed in a designated region to form multiple dynamic light spots with different sizes and snowflake patterns, making a snow scene more vivid with light and shade interlacing, and enhancing the sense of layering of a projected image. In addition, an assembly design with a simple structure is adopted, and the waterproof design facilitates mounting, which is capable of adapting to various complex environments.

As mentioned above, one or more implementations are provided in combination with specific contents, and it is not deemed that the specific implementation of the present invention is merely limited to these descriptions. Any method, structure and the like similar to or identical to those of the present invention, or several technical deductions or replacements made under the premise of the present invention conception, should be regarded as falling within the protection scope of the present invention.

What is claimed is:

1. A snowflake projection lamp, comprising a housing, a concatemer optical lens arranged at the front end of the housing, a main control board and a projection component arranged in the housing, and a rotating shaft component connected to the lower end of the housing, wherein the front end of the housing is provided with an opening, the inner side of the opening is provided with a first surrounding wall, the concatemer optical lens comprises a mounting base and a lens group, the lens group comprises at least two annular lenses, a first groove is formed on the mounting base, the first groove is internally provided with a sealing ring, and the concatemer optical lens is pressed on the first surrounding wall of the housing through the sealing ring;

the projection component comprises a film, a high-brightness light source component and a motor component, the motor component drives the film to rotate, and the projection component is electrically connected to the main control board; and the housing is rotationally connected to the rotating shaft component, the housing is internally provided with the main control board, the rear end of the housing is recessed inward to form a second groove, the second groove is provided with a first through hole for a power cord to pass through, the second groove is internally provided with a waterproof gasket and a pressing part, a second through hole and a third through hole are formed in the waterproof gasket and the pressing part respectively, and the first through hole, the second through hole and the third through hole communicate with one another, the pressing part is a hexagonal threaded head, an internal thread is provided on a side wall of the second groove, and the hexagonal threaded head is threadedly connected into the first through hole and presses the waterproof gasket into the second groove, the bottom of the housing is provided with a convex bar, the convex bar is arranged at one end of the housing close to the concatemer optical lens, an avoidance groove is formed on the convex bar, the mounting base is provided with a pressure block corresponding to the position of the avoidance groove, and the mounting base is fixed to the housing through a screw, the rotating shaft component comprises a first support, a second support, a damping spring and a sleeve fixing screw, the first support comprises a plugging plate in plug-in connection with the avoidance groove and a first connecting plate arranged perpendicularly to the plugging plate, the first connecting plate is connected to a plugging post, the second support comprises a first sleeve and a second sleeve arranged perpendicularly to the first sleeve, the plugging post is sleeved in the first sleeve and is fixed through the sleeve fixing screw, and the damping spring is arranged in a gap between the plugging post and the first sleeve, the first support and the second support are provided with a first tooth and a second tooth respectively, and the first tooth and the second tooth are meshed.

2. The snowflake projection lamp according to claim 1, wherein at least two kinds of snowflake patterns are arranged on the film, four light condensers and four lamp beads are respectively arranged correspondingly, and the four light condensers are arranged symmetrically in pairs.

3. The snowflake projection lamp according to claim 1, wherein at least two kinds of snowflake patterns are arranged on the film, four light condensers and four lamp beads are respectively arranged correspondingly, and the four light condensers are arranged symmetrically in pairs.

4. The snowflake projection lamp according to claim 3, wherein the high-brightness light source component comprises the light condensers and the lamp beads, the main control board is arranged between the motor component and the light condensers, the lamp beads are arranged on the main control board, and an output shaft of the motor component passes through the main control board and is connected to the film.

5. The snowflake projection lamp according to claim 4, wherein the lens group comprises thirty-seven annular lenses, and the area of a shading region between every two adjacent annular lenses is the same.

6. The snowflake projection lamp according to claim 1, further comprising a base detachably connected to the second sleeve, wherein the base comprises a bottom disc and a connecting post adapted to the second sleeve.

7. The snowflake projection lamp according to claim 1, further comprising a ground stake detachably connected to the second sleeve, wherein the ground stake comprises a mounting portion, a rod body and an embedded part, a convex step is arranged between the mounting portion and the rod body, the mounting portion is detachably sleeved in the second sleeve, and the second support abuts against the convex step.

* * * * *